United States Patent
Okuda

(10) Patent No.: US 10,511,752 B2
(45) Date of Patent: Dec. 17, 2019

(54) IN-VEHICLE CAMERA

(71) Applicant: DENSO CORPORATION, Kariya, Aichi-pref. (JP)

(72) Inventor: Sho Okuda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/960,984

(22) Filed: Apr. 24, 2018

(65) Prior Publication Data

US 2018/0316833 A1    Nov. 1, 2018

(30) Foreign Application Priority Data

May 1, 2017   (JP) ................................. 2017-091227

(51) Int. Cl.
| | |
|---|---|
| *H04N 5/225* | (2006.01) |
| *B60R 11/04* | (2006.01) |
| *B60R 11/00* | (2006.01) |
| *H01R 12/75* | (2011.01) |

(52) U.S. Cl.
CPC ........... *H04N 5/2253* (2013.01); *B60R 11/04* (2013.01); *H04N 5/2252* (2013.01); *B60R 2011/0026* (2013.01); *H01R 12/75* (2013.01)

(58) Field of Classification Search
CPC . B60R 11/04; B60R 2011/0026; H01R 12/75; H04N 5/2252; H04N 5/2253
See application file for complete search history.

(56) References Cited

U.S. PATENT DOCUMENTS

| | | | | |
|---|---|---|---|---|
| 10,033,934 | B2* | 7/2018 | Wang | ..................... H04N 7/183 |
| 2012/0013741 | A1* | 1/2012 | Blake, III | ............... B60R 11/00 |
| | | | | 348/148 |
| 2014/0160284 | A1* | 6/2014 | Achenbach | .......... H04N 5/2251 |
| | | | | 348/143 |
| 2014/0192188 | A1* | 7/2014 | McEwan | ............ G06K 9/00288 |
| | | | | 348/143 |
| 2015/0042798 | A1* | 2/2015 | Takeda | .................. H04N 5/2252 |
| | | | | 348/148 |
| 2017/0187931 | A1* | 6/2017 | Onishi | ...................... B60R 1/00 |
| 2018/0261912 | A1* | 9/2018 | Mizuno | ..................... H01Q 1/32 |

FOREIGN PATENT DOCUMENTS

JP         2003-051350 A         2/2003

* cited by examiner

*Primary Examiner* — Amy R Hsu
(74) *Attorney, Agent, or Firm* — Knobbe, Martens, Olson & Bear, LLP

(57) ABSTRACT

An in-vehicle camera has a first board, a second board, a cable, and a casing. The first board is electrically connected with the second board through the cable. The casing has a first casing and a second casing. A first surface of the first board and a first surface of the second board face the first casing and are covered with the first casing. The first board and the second board are assembled with the first casing. A second surface of the first board and a second surface of the second board are covered with the second casing. One end part of the cable is fixed to the first surface of the first board and the other end part of the cable is fixed to the first surface of the second board.

7 Claims, 4 Drawing Sheets

(COMPARATIVE EXAMPLE)

IN-VEHICLE CAMERA

CROSS-REFERENCE TO RELATED APPLICATION

This application is related to and claims priority from Japanese Patent Application No. 2017-91227 filed on May 1, 2017, the contents of which are hereby incorporated by reference.

BACKGROUND OF THE INVENTION

1. Field of the Invention

The present invention relates to in-vehicle cameras capable of suppressing the influence of noise generated therein.

2. Description of the Related Art

A patent document 1, Japanese patent laid open publication No. 2003-51350, discloses a conventional technique for connecting an electronic circuit board (or a printed circuit board) with a cable harness (which is also known as a wire harness). The electronic circuit board forms a vehicle electronic unit composed of a plurality of electronic circuit boards which are connected together through cables.

The conventional technique for connecting an electronic circuit board with a cable harness previously described is applied to an in-vehicle camera which is arranged at the inside of a windshield glass of a vehicle, for example. Specifically, such an in-vehicle camera has an imager board and a controller board.

Imagers are mounted on the imager board. The imagers receive incident light for producing front view images, convert the received incident light to image data, and generate and transmit image signals. A control circuit is mounted on the controller board, which receives the image signals transmitted from the imager board and performs an image processing on the received image signals.

In general, the imager board is arranged in an approximately vertical direction, which is perpendicular to a horizontal direction, in view of lenses in the imagers mounted on the imager board. On the other hand, the controller board having the control circuit is arranged in a direction which is approximately equal to the horizontal direction in order for the driver of the vehicle to have a clear field of view.

A casing is composed of an upper-side casing and a lower-side casing. The imager board and the controller board are assembled with the casing so that the casing accommodates the imager board and the controller board, and one surface of each of the imager board and the controller board is covered with the upper-side casing of the casing. The imager board and the controller board are electrically connected together through cables arranged on the other surface thereof which is not covered with the upper-side casing. The cables are fixed on the surface of each of the imager board and the controller board and covered with the lower-side casing.

Because this type of the in-vehicle camera performs high-speed data transmission of image signals from the imager board having the imagers to the controller board having the control circuit, the cables often generate noise. Because the lower-side casing is arranged close to each of the imager board and the controller board, noise generated in the cables is easily propagated to the outside of the casing. Recently, because a radio device, etc. is arranged near the in-vehicle camera, there is a strong demand to suppress noise generated by the in-vehicle camera of a vehicle.

SUMMARY

It is therefore desired to provide an in-vehicle camera capable of suppressing the influence of noise generated in the in-vehicle camera.

An exemplary embodiment provides an in-vehicle camera arranged at a windshield glass side in a compartment of a vehicle to capture front view images of the vehicle. The in-vehicle camera has a lens, a first board, a second board, a casing and a cable. Front view images of a vehicle are captured through the lens of an optical unit.

The first board on which an imager is mounted. The imager converts the optical images obtained through the lens to image signals. The first board has a first surface and a second surface. A control circuit is mounted on the second board. The control circuit performs image processing on the optical images. The second board also has a first surface and a second surface. The casing accommodates the first board and the second board. The casing has a first casing and a second casing. The first surface of the first board and the first surface of the second board are covered with the first casing. The second surface of the first board and the second surface of the second board are covered with the second casing. The first board is electrically connected to the second board through the cable. The cable is directly or indirectly fixed to the first surface side of the first board and the first surface of the second board. For example, through other components, it is possible for the cable to be indirectly fixed to the first surface side of the first board and the first surface of the second board.

The improved structure of the in-vehicle camera 1 according to an exemplary embodiment allows the cable to easily be arranged in a chamber formed by the first casing, the first board and the second board in the casing. This makes it possible to deviate the cable from the casing when compared with a conventional structure in which the cable is arranged and fixed to the second surface of the first board and the second surface of the second board which face the second casing. This makes it possible to suppress the negative influence of noise generated in the in-vehicle camera.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
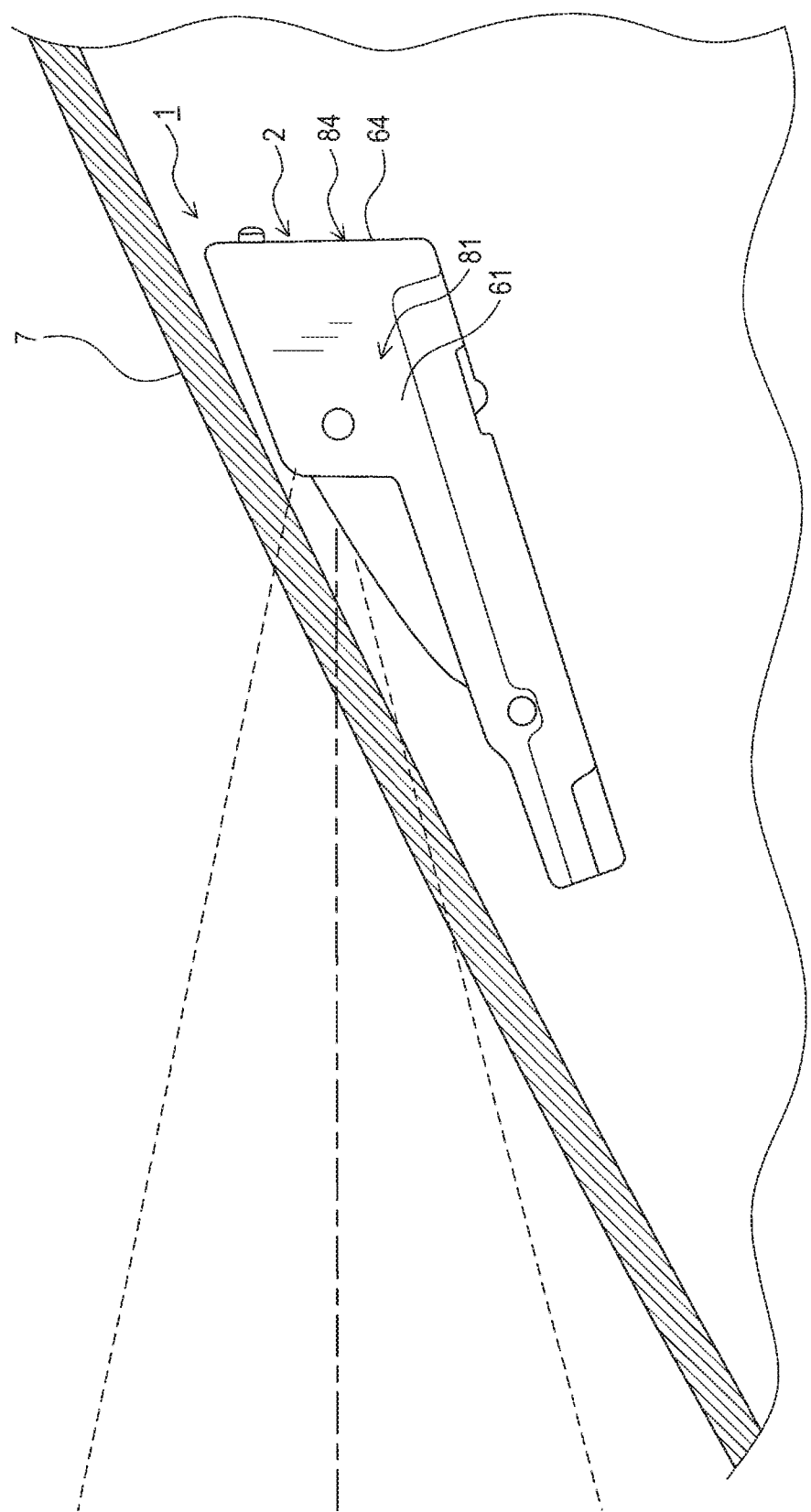
FIG. 1 is a view showing a schematic arrangement of an in-vehicle camera mounted on a windshield glass in a compartment of a vehicle according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of an in-vehicle camera 1 according to an exemplary embodiment with reference to FIG. 1 to FIG. 4.

FIG. 1 is a view showing a schematic arrangement of the in-vehicle camera 1 mounted on a windshield glass 7 in a compartment of a vehicle according to the exemplary embodiment of the present invention.

(Structure)

As shown in FIG. 1, the in-vehicle camera 1 according to the exemplary embodiment is arranged on the inside surface of the windshield glass 7 of the vehicle so as to capture front view images of a vehicle. That is, the in-vehicle camera 1 is arranged at the upper side of the windshield glass 7 and close to a rearview mirror arranged in a compartment of the vehicle. Hereinafter, a forward direction, a rear direction, a right-hand side direction, a left-hand side direction, a vertical direction will be used when viewed from the in-vehicle camera 1 arranged on the inside surface of the windshield glass 7. Those directions will be used for overall components in the in-vehicle camera 1.

Figure 2:
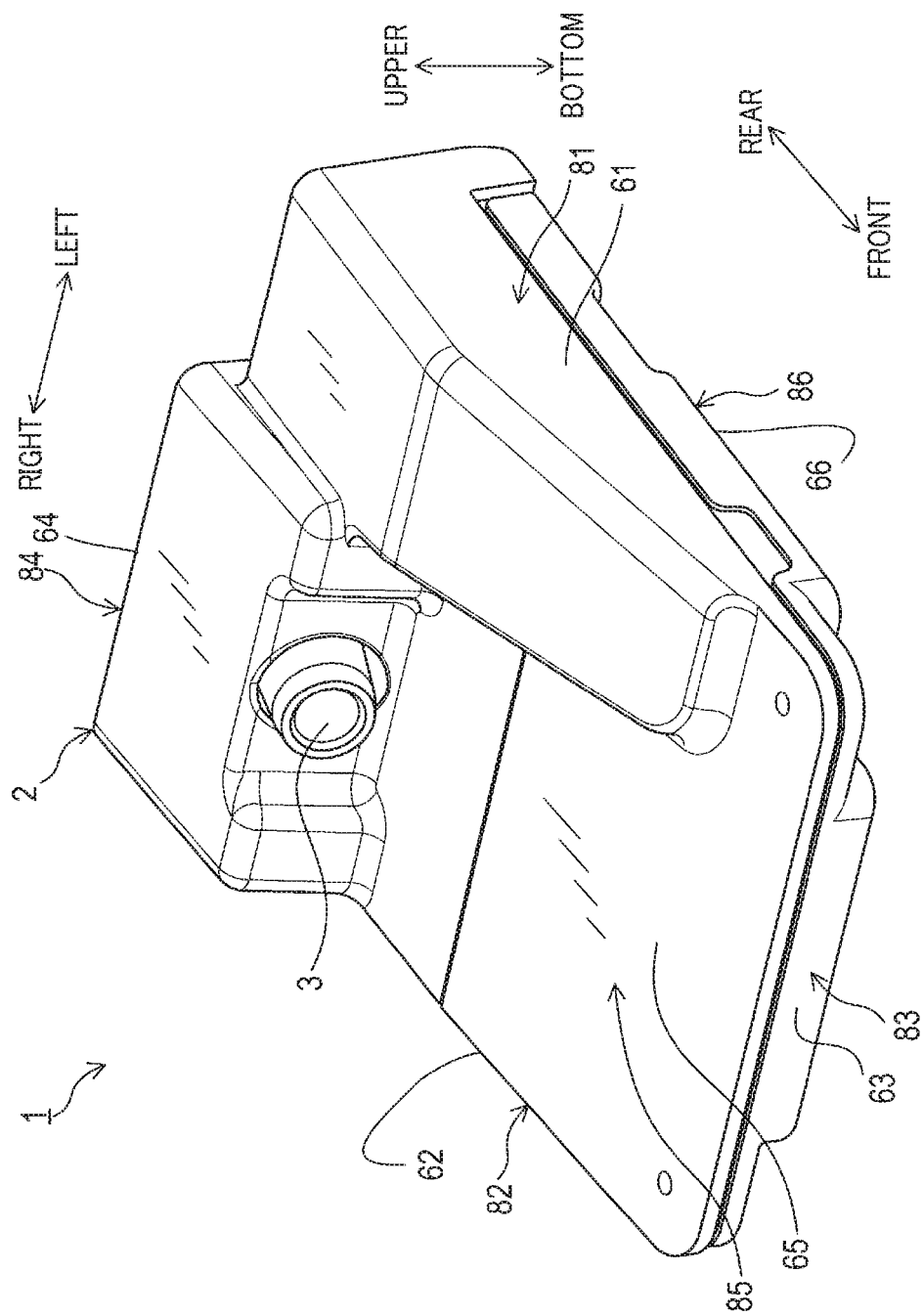
FIG. 2 is a perspective view showing a structure of the in-vehicle camera according to the exemplary embodiment shown in FIG. 1.
Figure 3:
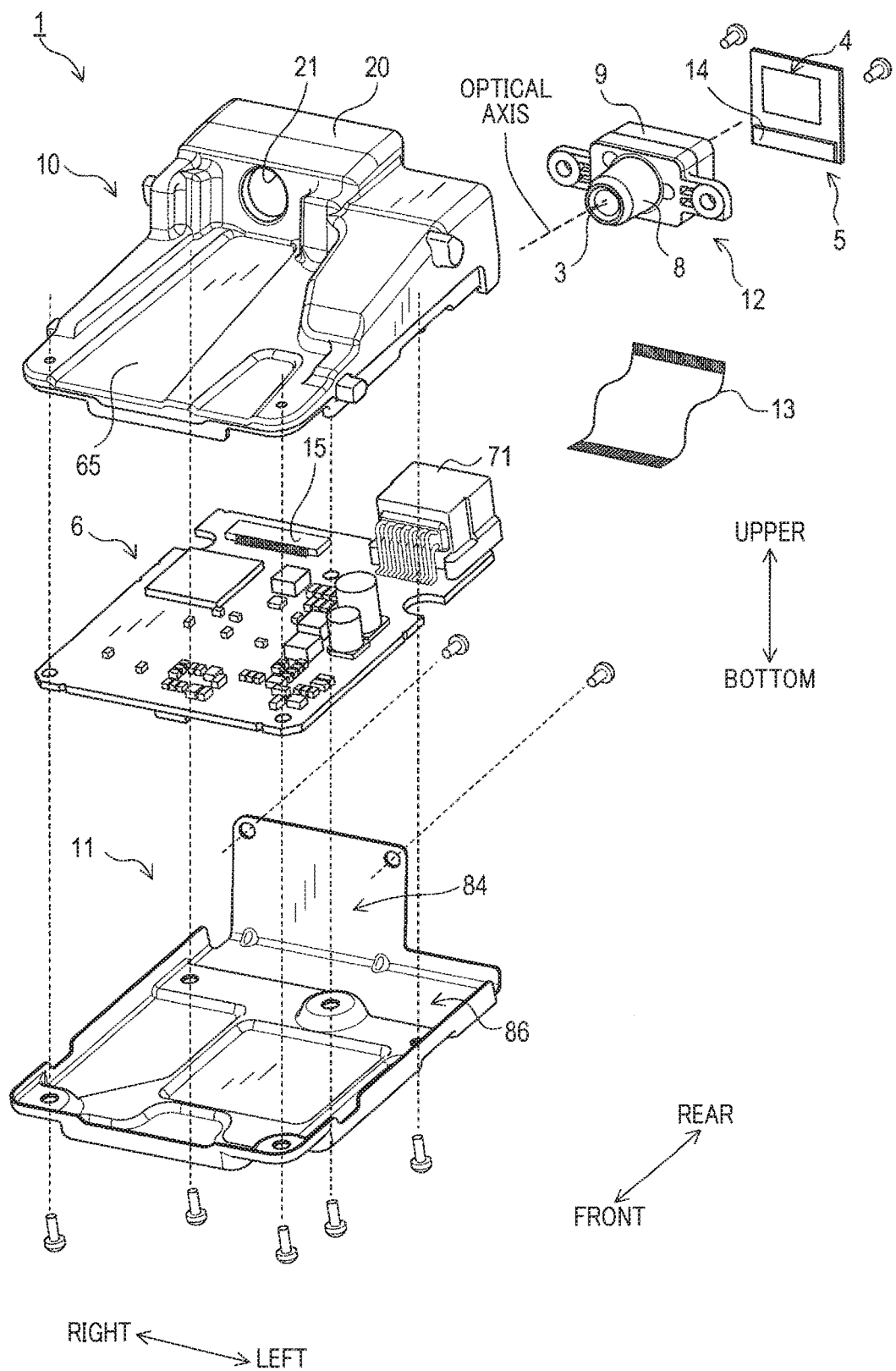
FIG. 3 is an exploded view of the in-vehicle camera according to the exemplary embodiment shown in FIG. 1.
Figure 4:
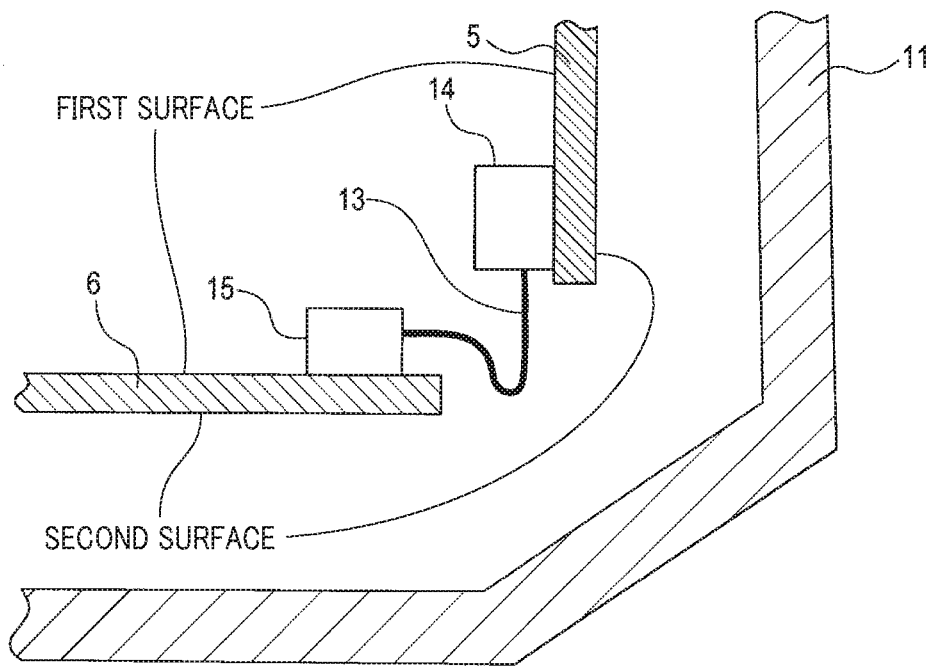
FIG. 4 is a view showing a cross section of the in-vehicle camera according to the exemplary embodiment shown in FIG. 1.

FIG. 2 is a perspective view showing a structure of the in-vehicle camera 1 according to the exemplary embodiment shown in FIG. 1. FIG. 3 is an exploded view of the in-vehicle camera 1 according to the exemplary embodiment shown in FIG. 1. FIG. 4 is a view showing a cross section of the in-vehicle camera 1 according to the exemplary embodiment shown in FIG. 1.

As shown in FIG. 2 to FIG. 4, the in-vehicle camera 1 has a casing 2, an optical unit 12, a first board 5, a second board 6 and a cable 13. The casing 2 accommodates the cable 13, the first board 5, the second board 6 and the optical unit 12. As will be explained later, the cable 13 has a film-shaped member.

As shown in FIG. 2, the casing 2 has a box shape so that a front side thereof has a reduced thickness. The casing 2 is composed of a left-hand side wall 81, a right-hand side wall 82, a front side wall 83, a rear side wall 84, an upper side wall 85 and a base side wall 86. The left-hand side wall 81 and the right-hand side wall 82 are arranged to keep a predetermined interval in a left and right direction so that the left-hand side wall 81 faces the right-hand side wall 82. The front side wall 83 is arranged at the front side of the casing 2. The rear side wall 84 is arranged at a rear side of the casing 2. That is, the left-hand side wall 81 is connected with the right-hand side wall 82 through the front side wall 83 and the rear side wall 84. The left-hand side wall 81 is connected with the right-hand side wall 82 through the upper side wall 85 and the base side wall 86 so that the upper side wall 85 is arranged at an upper side of the casing 2, and the base side wall 86 is arranged at a bottom side of the casing 2.

As shown in FIG. 2, the casing 2 further has a left-hand side surface 61, a right-hand side surface 62, a front side surface 63, a rear side surface 64, an upper side surface 65 and a bottom side surface 66.

The left-hand side surface 61 is an outer surface of the left-hand side wall 81. The right-hand side surface 62 is an outer surface of the right-hand side wall 82. The front side surface 63 is an outer surface of the front side wall 83. The rear side surface 64 is an outer surface of the rear side wall 84. The upper side surface 65 is an outer surface of the upper side wall 85. The bottom side surface 66 is an outer surface of the base side wall 86.

As shown in FIG. 1, the in-vehicle camera 1 according to the exemplary embodiment is arranged at the inside of the windshield glass 7, and the upper side surface 65 of the upper side wall 85 in the casing 2 is arranged facing to the windshield glass 7. That is, the upper side wall 85 in the casing 2 faces the windshield glass 7, and the base side wall 86 is arranged in opposite to the upper side wall 85.

As shown in FIG. 3, the casing 2 has a first casing 10 and a second casing 11. The first casing 10 is arranged facing the second casing 11. The first casing 10 and the second casing 11 are assembled together to form the casing 2. The first casing 10 forms the upper side wall 85, and a part of each of the left-hand side wall 81, the right-hand side wall 82, the front side wall 83 and the rear side wall 84. The second casing 11 forms the base side wall 86 of the casing 2 and a part of each of the left-hand side wall 81, the right-hand side wall 82, the front side wall 83 and the rear side wall 84. In other words, the upper side surface 65 of the casing 2 corresponds to the upper side surface 65 of the first casing 10, and the bottom side surface 66 of the casing 2 corresponds to the bottom side surface 66 of the second casing 11.

The first casing 10 is made of aluminum. The first casing 10 has the upper side wall 85, a part of the left-hand side wall 81, a part of the right-hand side wall 82, a part of the front side wall 83 and a part of the rear side wall 84.

The upper side wall 85 has a protruding part 20, which protrudes in the upside direction, at the rear side of the upper side wall 85 so as to accommodate the optical unit 12 and the first board 5. The protruding part 20 has a lens hole 21 which is open in a forward direction of the in-vehicle camera 1.

The optical unit 12, the first board 5, the second board 6, the second casing 11 are arranged in the first casing 10 and fixed to the first casing 10. The second casing 11 is made of aluminum.

The second casing 11 is composed of the base side wall 86, a part of the rear side wall 84, a part of the front side wall 83, a part of the left-hand side wall 81 and a part of the right-hand side wall 82. The base side wall 86 has the bottom side surface 66 having a plate shape. The rear side wall 84 is arranged along a vertical direction in the casing 2 at the rear side of the vehicle when the casing is arranged at the inside of the windshield glass 7.

The optical unit 12 has a cylindrical mirror part 8, a base part 9 and a lens 3. The cylindrical mirror part 8 and the base part 9 are made of resin and assembled together.

The cylindrical mirror part 8 has a cylindrical shape, and accommodates the lens 3. The lens 3 arranged in the inside of the cylindrical mirror part 8 has a lens hole 21 to receive incident light of front view images. The lens 3 is arranged in the inside of the cylindrical mirror part 8 so that an optical axis of the lens 3 coincides with a central axis of the cylindrical mirror part 8.

The base part 9 in the optical unit 12 has a rectangle shape which extends toward a direction which is perpendicular to the optical axis of the lens 3. The rear side of the base part 9 is open. The base part 9 has an attachment part by which the optical unit 12 is fixed to the first casing 10. The attachment part of the base part 9 extends toward the left and right direction.

The first board 5 has a plate shape on which an imager 4 and a first connector 14 are mounted. The imager 4 has a rectangle shape and is composed of a light reception surface. The imager 4 receives incident light which have been focused on the light reception surface, and converts the received light to image signals. Specifically, the imager 4 is a semiconductor imager sensor elements such as CMOS (complementary metal oxide semiconductor) image sensors.

The first connector 14 has a rectangle shape extending in the left and right direction. The first connector 14 is arranged at a lower side of the surface, on which the imager 4 is implemented, covered with the first casing 10. A first end part of the cable 13 is inserted into and electrically fitted with the first connector 14.

The first board 5 transmits the image signals, which have been converted by the imager 4, to the second board 6 through the cable 13. The first board 5 is assembled with an opening part of the optical unit 12 arranged at the rear side of the base part 9 in the optical unit 12 so that a first surface of the first board 5 is arranged at the front side of the first board 5. The imager 4 and the first connector 14 are mounted on the first surface of the first board 5. The first board 5 and the optical unit 12 are accommodated in the protruding part 20. That is, the first board 5 is assembled with the first casing 10 so that the first surface of the first board 5 is covered with the first casing 10 and arranged in a direction which is perpendicular to the lateral direction of the in-vehicle camera 1, or arranged in a direction which is approximately perpendicular to the lateral direction of the in-vehicle camera 1. A second surface of the first board 5, which is opposite to the first surface thereof is covered with the second casing 11.

Components mounted on the second board 6 store image signals obtained by the imager 4 and the image signals processed by an image processing large scale integration (image processing LSI) into a memory unit. The function of the image processing LSI will be explained later. Further, the components mounted on the second board 6 transmit the image signals to other devices. When the first casing 10 and the second casing 11 are assembled together to form the in-vehicle camera 1, a first surface of the second board 6 faces the upper side wall 85 of the first casing 10, and a second surface of the second board 6 faces the base side wall 86 of the second casing 11. That is, the second board 6 is assembled with the first casing 10 so that the first casing 10 accommodates the first surface of the second board 6 in the lateral direction of the in-vehicle camera 1. The second surface of the second board 6 is covered with the second casing 11, and is not covered with the first casing 10.

The image processing LSI, a second connector 15 and a third connector 71, etc. are mounted on the second board 6. The image processing LSI mounted on the second board 6 processing the image signals which have been converted by the imager 4 previously described. The image processing LSI is mounted on the second surface of the second board 6, which faces the base side wall 86 of the second casing 11.

The second connector 15 has a rectangle shape, and is arranged on the first surface of the second board 6, which faces the upper side wall 85 of the first casing 10, i.e. is arranged at the right-hand side in the rear side on the first surface of the second board 6 which is covered with the first casing 10.

The second connector 15 is formed so that a second end part of the cable 13 is inserted into and fixed to the second connector 15, similar to the first connector 14 previously described.

The third connector 71 is used to supply an electric power of a power source, and to perform electrical communication. The third connector 71 is arranged at the left-hand side in the rear side of the casing 2. Through the third connector 71, the electric power of the vehicle is supplied to the devices arranged on the first board 6 and electric signals and arithmetic results are transmitted to the outside devices (not shown). The image processing LSI corresponds to a control circuit.

The first board 5 and the second board 6 are arranged in the casing 2 so that the first board 5 and the second board 6 tilt at a predetermined angle in the casing 2. That is, the first casing 10, the first board 5 and the second board 6 form an inner chamber formed in the casing 2. In more detail, the first board 5 and the second board 6 are arranged at a different angle in the casing 2 composed of the first casing 10 and the second casing 11. For example, in the structure of the in-vehicle camera 1 according to the exemplary embodiment, the first board 5 and the second board 6 are arranged in the casing 2 so that the first board 5 is approximately perpendicular to the second board 6 (see FIG. 4).

The cable 13 is a film-shaped member in which a plurality of conductors are arranged along a width direction thereof. The first board 5 is electrically connected to the second board 6 through the cable 13.

As shown in FIG. 4, the first end part of the cable 13 is inserted into and electrically fitted with the first connector 14 and the second end part of the cable 13 is inserted into and electrically fitted with the second connector 15 so that the first connector 14 is arranged on the first surface of the first board 5, which faces the first casing 10, and the second connector 15 is arranged on the first surface of the second board 6, which also faces the first casing 10.

EFFECTS OF THE INVENTION

A description will be given of the effects of the in-vehicle camera 1 having the improved structure previously described.

(E1) In the structure of the in-vehicle camera 1 according to the exemplary embodiment previously described, the first surface of the first board 5 and the first surface of the second board 6 are fixed to the first casing 10 so that the first board 5 and the first surface of the second board 6 are covered with the first casing 10 of the casing 2. Further, the second surface of the first board 5 and the second surface of the second board 6 are covered with the second casing 11 of the casing 2. Still further, the cable 13 is fixed to the first surface of the first board 5 and the first surface of the second board 6, which are covered with the first casing 10. In other words, as shown in FIG. 4, the first board 5 and the second board 6 are arranged to keep a predetermined constant angle, the cable 13 is fixed to the first connector 14 and the second connector 15, the first connector 14 is arranged on and fixed to the first surface of the first board 5, and the second connector 15 is arranged on and fixed to the first surface of the second board 6.

Figure 5:
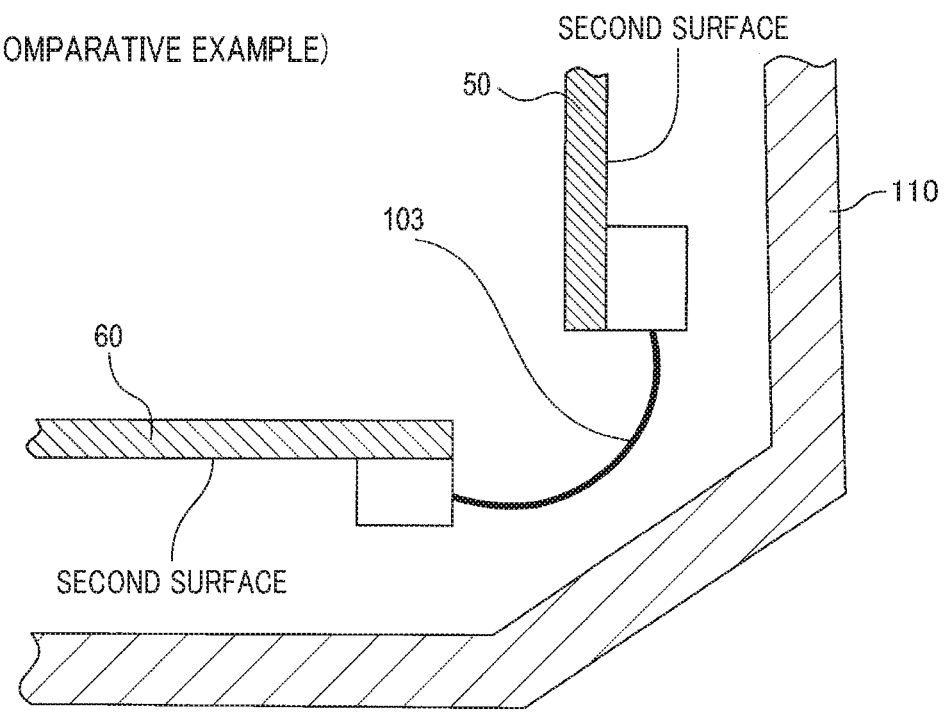
FIG. 5 is a view showing a cross section of an in-vehicle camera according to a comparative example.

FIG. 5 is a view showing a cross section of an in-vehicle camera having a first board 50 and a second board 60 and a cable 103 according to a comparative example. As shown in FIG. 5, in the structure of the in-vehicle camera as a conventional example, the second surface of the first board 50 and the second surface of the second board 60 are covered with a second casing 110, and the cable 103 is fixed to the second surface of the first board 50 and the second surface of the second board 60, which are covered with the second casing 110.

When compared with the structure of the in-vehicle camera according to the comparative example shown in FIG. 5, the in-vehicle camera 1 according to the exemplary embodiment has the improved structure shown in FIG. 4 in which the cable 13 more deviates in distance from the second casing 11, and this makes it possible to prevent the cable 13 from being close to the second casing 11. In addition, according to the improved structure of the in-vehicle camera 1 of the exemplary embodiment, it is possible to easily arrange the cable 13 into the inner chamber formed by the first board 5, the second board 6 and the first casing 10, where the first board 5 and the second board 6 are arranged to keep the predetermined angle. This structure makes it possible to prevent the cable 13 from being close to the first casing 10 in addition to the second casing 11, i.e. to prevent the cable 13 from being close to the casing 2. This structure makes it possible to prevent the negative influence of noise generated in the inside of the in-vehicle camera 1.

(E2) According to the improved structure of the in-vehicle camera 1 of the exemplary embodiment, the cable 13 is fixed to the first surface of the first board 5 and the first surface of the second board 6, where the first surface of the first board 5 and the first surface of the second board 6 face the first casing 1 side, and the first board 5 and the second board 6 are arranged to keep the predetermined angle.

When compared with the structure of the in-vehicle camera according to the comparative example shown in FIG. 5 in which the cable 103 is fixed to the second surface of the first board 50 and the second surface of the second board 60, the improves structure of the in-vehicle camera 1 according to the exemplary embodiment makes it possible to shorten the total length of the cable 13. Accordingly this reduces the manufacturing cost of the in-vehicle camera.

The structure of the in-vehicle camera according to the comparative example shown in FIG. 5 requires to fix the cable 103 to the second surface of the first board 50 and the second surface of the second board 60, which face the second casing 110 and is opposite in position to the first casing, after the first board 50 and the second board 60 have been assembled with and fixed to the first casing.

On the other hand, according to the improved structure of the in-vehicle camera 1 of the exemplary embodiment, the first board 5 and the second board 6 are easily mounted on and fixed to the first casing 10 after the cable 13 has been fixed to the first board 5 and the second board 6. This structure makes it possible to easily fix the cable 13 to the first surface side of the first board 5 and the first surface side of the second board 6, which face the first casing 10 side.

(E3) In the structure of the in-vehicle camera 1 of the exemplary embodiment, the in-vehicle camera 1 is mounted on at the inside surface of the windshield glass 7 close to a rearview mirror arranged in the compartment of the vehicle. Accordingly, even if an antenna of a car radio is mounted near the in-vehicle camera 1, it is possible to prevent the antenna of the car radio, etc. from being influenced by noise generated in the in-vehicle camera 1.

(Modifications)

The concept of the present invention is not limited by the exemplary embodiment previously described.

It is acceptable for the casing 2 of the in-vehicle camera 1 to have components in addition to the first casing 10 and the second casing 11.

It is further acceptable for the cable 13 to have another shape instead of being a film-shaped member.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An in-vehicle camera arranged at a windshield glass side in a compartment of a vehicle to capture front view images of the vehicle, the in-vehicle camera comprising:
    a lens of an optical unit through which front view images of a vehicle are captured;
    a first board on which an imager is mounted, the imager converting the optical images obtained through the lens to image signals, the first board comprising a first surface and a second surface;
    a second board on which a control circuit capable of performing an image processing of the optical images is mounted, the second board comprising a first surface and a second surface;
    a casing configured to accommodate the first board and the second board, the casing comprising a first casing and a second casing, the first surface of the first board and the first surface of the second board being covered with the first casing, the first casing comprising a protruding part protruding at a rear side of the first casing so as to accommodate the optical unit and the first board, the protruding part comprising an opening through which the lens is exposed outward from the in-vehicle camera, the second surface of the first board and the second surface of the second board being covered with the second casing; and
    a cable, through which the first board is electrically connected to the second board, being fixed to the first surface side of the first board and the first surface of the second board.

2. The in-vehicle camera according to claim 1, wherein
    a first connector is mounted on the first surface of the first board which is covered with the first casing,
    a second connector is mounted on the first surface of the second board which is covered with the first casing, and
    a first end part of the cable is inserted into and electrically fitted with the first connector, and a second end part of the cable is inserted into and electrically fitted with the second connector.

3. The in-vehicle camera according to claim 1, wherein the first casing is arranged at the windshield glass side closer to the windshield glass than the second casing.

4. The in-vehicle camera according to claim 1, wherein a first length of the first casing, which is measured along a direction perpendicular to an optical axis of the lens at the first board side is longer than a second length of the first casing, which is measured along a direction perpendicular to the optical axis of the lens at the second board side.

5. The in-vehicle camera according to claim 1, wherein the first board and the second board are arranged in the casing to keep a predetermined angle, and the cable is accommodated in a chamber formed by the first casing, the first board and the second board.

6. The in-vehicle camera according to claim 5, wherein the first board is arranged perpendicular to the second board in the casing.

7. The in-vehicle camera according to claim 1, wherein the first board and the second board are assembled with the first casing.

* * * * *